(12) United States Patent
Kaatz

(10) Patent No.: US 6,934,299 B2
(45) Date of Patent: Aug. 23, 2005

(54) BEACON PACKET HAVING TRAFFIC INDICATOR FLAG

(75) Inventor: Gary F. Kaatz, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 89 days.

(21) Appl. No.: 10/456,074

(22) Filed: Jun. 6, 2003

(65) Prior Publication Data

US 2004/0246983 A1 Dec. 9, 2004

(51) Int. Cl.⁷ .............................................. H04L 12/43
(52) U.S. Cl. ....................... 370/459; 370/432; 370/443
(58) Field of Search ................................. 370/432, 450, 370/459, 471, 491, 326, 336, 352, 392, 443, 449

(56) References Cited

U.S. PATENT DOCUMENTS

2003/0135797 A1 * 7/2003 Choi ........................... 714/704
2004/0081140 A1 * 4/2004 Martin ........................ 370/352

OTHER PUBLICATIONS

"FLEX Protocol Specification and FLEX Encoding and Decoding Requirements", Issue: G1.8, Motorola, Inc., May 7, 1996.
IEEE Std 802.11–1997, "Part 11: Wireless LAN Medium Access Control (MAC) and Physical Layer (PHY) specifications". The Institute of Electrical and Electronic Engineers, Inc., 1997, Sections 7.23, 7.2.3.1, 7.3, and 15.2.3.4.
ANSI/IEEE Std 802.11, 1999 Edition, "Part 11: Wireless LAN Medium Access Control (MAC) and Physical Layer (PHY) Specifications"; The Institute of Electrical and Electronic Engineers, Inc., 1999, Sections abstract, 7.23, 7.2.3.1, 7.3, and 15.2.3.4.
IEEE Std 802.11b–1999, "Part 11:Wireless LAN Medium Access Control (MAC) and Physical Layer (PHY) Specifications", The Institute of Electrical and Electronic Engineers, Inc., 1999, Sections 7.2.3.1, and 7.3.1.4–7.3.2.2.
IEEE P802.11g/D8.2 Apr 2003, "Draft Supplement to Standard [for] Information Technology".The Institute of Electrical and Electronic Engineers, Inc., 2003, Sections 7.23, 7.2.3.1, 7.3, and 19.3.2.1.

* cited by examiner

Primary Examiner—Phirin Sam

(57) ABSTRACT

Disclosed are systems, methods, computer program products and computer data signals for broadcasting a beacon packet to one or more client stations and for processing a beacon packet. The beacon packet includes a preamble, a header and a data portion. In one broadcasting method, it is determined if there is any data buffered for any of the client stations. If there is data buffered, a traffic indicator flag located before the data portion of the beacon packet is set to a first logic value. If there is not any data buffered, the traffic indicator flag is set to a second logic value. The beacon packet is broadcast to the client stations.

18 Claims, 5 Drawing Sheets

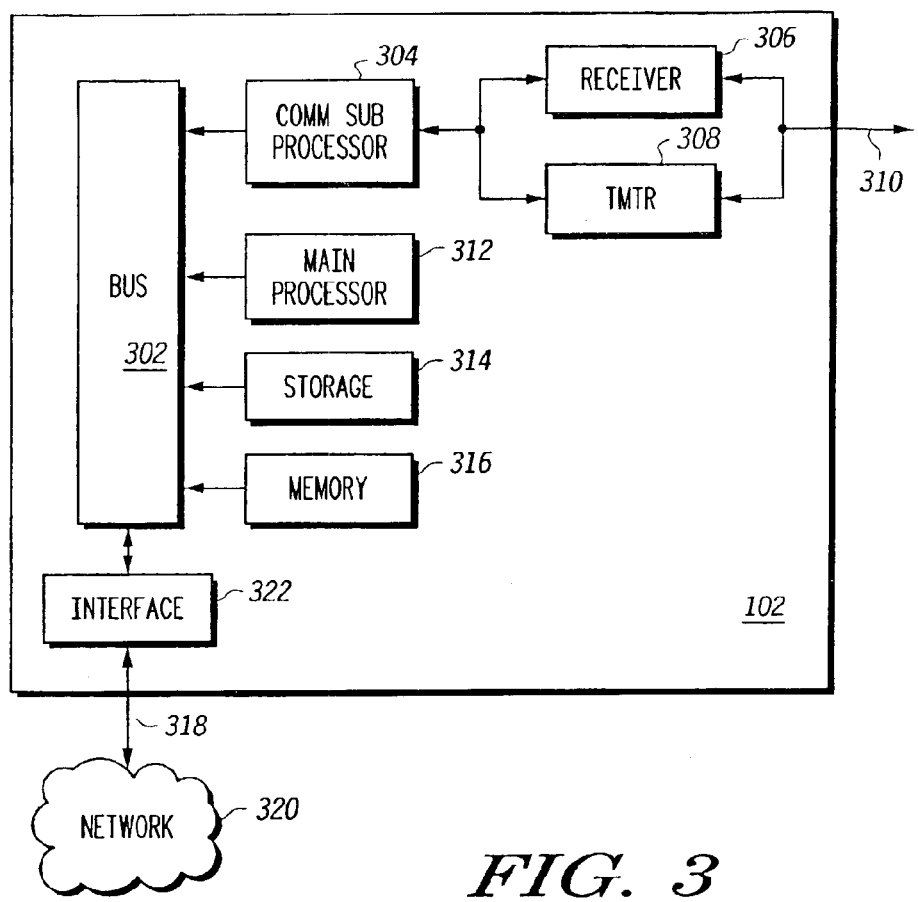
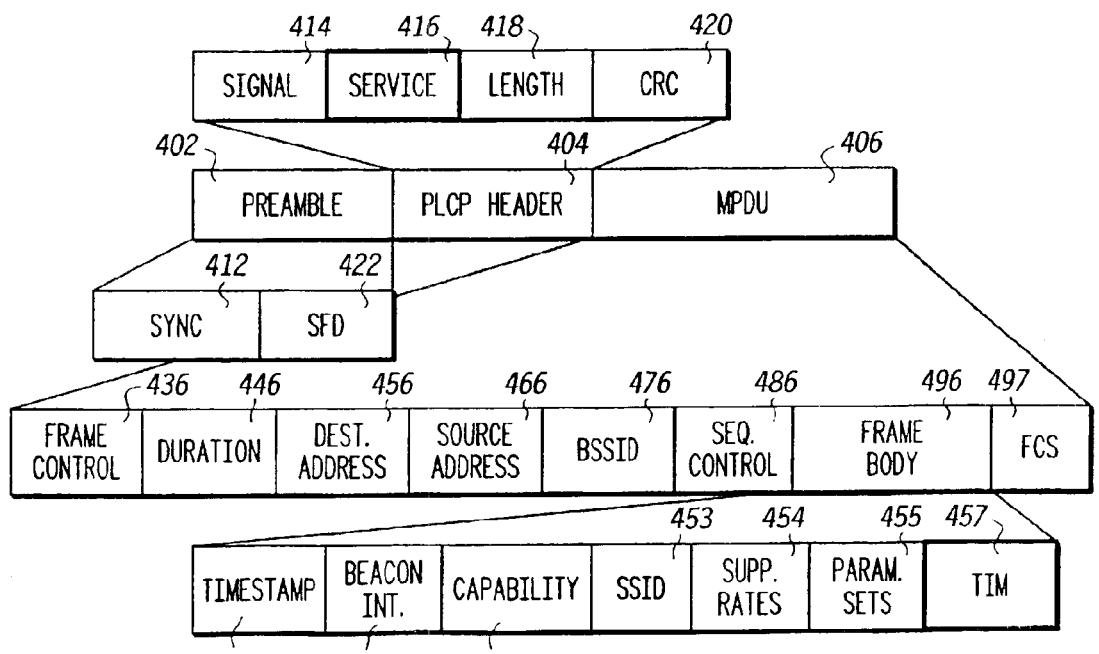

| b0 | b1 | b2 | b3 | b4 | b5 | b6 | b7 |
|---|---|---|---|---|---|---|---|
| RESERVED | RESERVED | LOCKED CLOCKS BIT | MOD. SELECTION BIT | RESERVED | RESERVED | RESERVED | LENGTH EXTENSION BIT |
| 502 | 504 | 506 | 508 | 510 | 512 | 514 | 516 |

BEACON PACKET HAVING TRAFFIC INDICATOR FLAG

FIELD OF THE INVENTION

The present invention generally relates to the field of wireless communications, and more particularly relates to wireless networking of wireless devices.

BACKGROUND OF THE INVENTION

With the advent of the IEEE 802.11 wireless communications standard, a new market in wireless communications was born. The 802.11 communications standard describes a protocol for allowing wireless devices to communicate with a wireless base station. The wireless base station (also known as an Access Point or AP) provides a network for the wireless devices connected wirelessly to the wireless base station. In addition, the wireless base station can further be connected to a Local Area Network (LAN), a Wide Area Network (WAN), a Public Switched Telephone Network (PSTN), a dedicated line, or the like. Such a connection provides further network access to the wireless devices connected wirelessly to the wireless base station. Wireless network access for users of wireless devices is beneficial, as it provides users with added communication abilities when moving around a building or office, or traveling and otherwise on the road. Wireless network access, however, does not come without its drawbacks.

A wireless base station regularly broadcasts beacon packets (every 100 ms, for example) to all of the client stations (i.e., wireless devices) connected wirelessly to the wireless base station. A beacon packet holds a variety of information for processing by each wireless device connected wirelessly to the wireless base station. One aspect of the information that is present in a beacon packet is traffic indication. Traffic indication is information that indicates whether or not there is data buffered for any of the wireless devices connected wirelessly to the wireless base station. Traffic indication information, however, is located almost at the end of a conventional beacon packet.

A client station (or wireless device) must process an entire beacon packet in order to determine whether there is data buffered for that wireless device. This is wasteful of processing resources, as the wireless device is forced to process a multitude of information that is not useful if there is no data buffered for the wireless device. This is compounded by the fact that a beacon packet is broadcast every 100 ms or so. Further, during processing of a beacon packet, the wireless device must be in a normal operating mode, and therefore consumes power at a normal operating rate. This is wasteful of battery resources in portable devices, as the wireless device is forced to expend battery resources to process information that is not useful to the wireless device. Again, this is compounded by the fact that a beacon packet is broadcast every 100 ms or so.

Therefore a need exists to overcome the problems with the prior art as discussed above.

SUMMARY OF THE INVENTION

Briefly, in accordance with one aspect of the present invention, there is provided a method for broadcasting a beacon packet to one or more client stations, with the beacon packet including a preamble, a header and a data portion. According to the method, it is determined if there is any data buffered for any of the client stations. If there is data buffered, a traffic indicator flag located before the data portion of the beacon packet is set to a first logic value. If there is not any data buffered, the traffic indicator flag is set to a second logic value. The beacon packet is broadcast to the client stations.

In accordance with another aspect of the present invention, there is provided a method for processing a beacon packet, with the beacon packet including a preamble, a header and a data portion. According to the method, the beacon packet is received, and a first portion of the beacon packet is processed so as to determine a value of a traffic indicator flag located before the data portion of the beacon packet. If the traffic indicator flag has a first logic value, a sleep mode is entered. If the traffic indicator flag has a second logic value, all or substantially all of the remaining portion of the beacon packet is processed.

In accordance with yet another aspect of the present invention, there is provided a computer data signal embodied in a beacon packet, with the beacon packet including a preamble, a header and a data portion. The computer data signal includes a first code segment including a traffic indicator flag that is located before the data portion of the beacon packet, and a second code segment including a plurality of client-specific traffic indicator flags being located within the data portion of the beacon packet. The traffic indicator flag is set to a first logic value to indicate that there is data buffered for one or more client stations, or is set to a second logic value to indicate that there is not any data buffered. Each of the client-specific traffic indicator flags indicates whether or not there is any data buffered for a corresponding one of the client stations.

BRIEF DESCRIPTION OF THE DRAWINGS

FIG. 3 is a block diagram of a conventional wireless base station for use in a wireless communication system.

FIG. 4 is a diagram of a beacon packet according to one embodiment of the present invention.

DETAILED DESCRIPTION

The present invention, according to a preferred embodiment, overcomes problems with the prior art by eliminating the need for client stations to process all or substantially all of a beacon packet when there is no data buffered.

Figure 1:
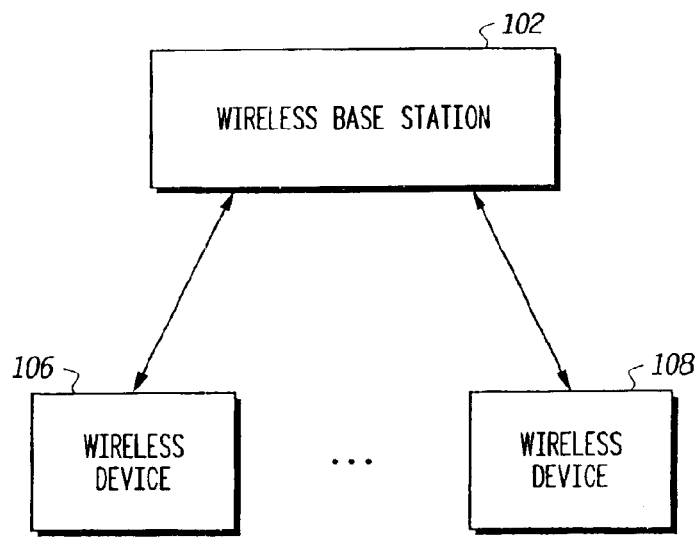
FIG. 1 is a block diagram illustrating a conventional wireless network.

FIG. 1 is a block diagram illustrating a conventional wireless network. The exemplary wireless network of FIG. 1 includes a wireless base station 102, and wireless devices 106 through 108. Wireless base station 102 is a radio-enabled network access point for wireless devices 106 through 108. In one embodiment, the wireless base station 102 is a router with an integrated wireless access point complying with the IEEE 802.11(b) wireless communication standard. The wireless base station 102 supports a large number of wireless devices 106 through 108, otherwise known as client stations.

Each wireless device 106 through 108 is a desktop computer, laptop computer, handheld computer, palmtop computer, mobile phone, push-to-talk mobile radio, text messaging device, two way pager, one-way pager, or any other wireless communications enabled device. Each wireless device 106 through 108 is equipped with a transmitter and receiver for communicating with the wireless base station 102 according to the appropriate wireless communication standard. In one embodiment of the present invention, each wireless device 106 through 108 is equipped with an IEEE 802.11(b) compliant wireless access chipset for communicating with wireless base station 102.

Wireless base station 102 can also include a network connection (not shown). The network connection is a connection to any one or any combination of a Local Area Network (LAN), a Wide Area Network (WAN), a Public Switched Telephone Network (PSTN), a dedicated line, or the like. Such a connection provides further network access to wireless devices 106 through 108.

Figure 2:
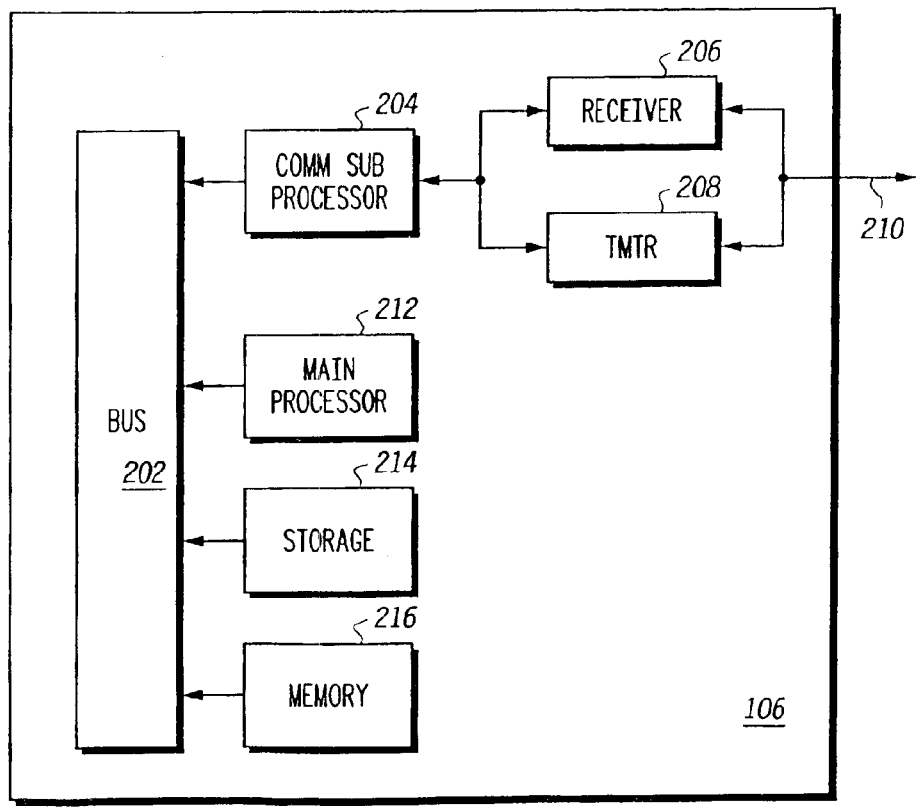
FIG. 2 is a block diagram of a conventional wireless device for use in a wireless communication system.

FIG. 2 is a block diagram of a conventional wireless device 106 for use in a wireless communication system. The wireless device 106 includes a receiver 206 and a transmitter 208 for transmitting and receiving information via radio or other wireless signals (i.e., channel 210) to and from wireless base station 102. In one embodiment of the present invention, receiver 206 and transmitter 208 operate over channel 210 in accordance with the IEEE 802.11(b) wireless communication standard. All information sent and received via the receiver 206 and transmitter 208 is processed by a communications sub-processor 204.

The wireless device 106 includes a main processor 212 that handles all processes associated with the receiving and transmitting functions of the wireless device 106. The main processor 212 may also perform other functions of the wireless device 106. FIG. 2 also includes storage 214 for storing information and main memory 216, such as a volatile memory element like a DRAM module or a non-volatile memory such as a Flash EEPROM module or both. The main memory 216 is used for storing data and instructions necessary for performing the functions of wireless device 106. Communications bus 202 provides a conduit for communications between communications sub processor 204, the main processor 212, storage 214 and the main memory 216. In other embodiments, the wireless device lacks its own processor. In such embodiments, functions of the wireless device such as processing of packets are handled by a processor on a host system to which the wireless device is connected.

FIG. 3 is a block diagram of a conventional wireless base station 102 for use in a wireless communication system. The wireless base station 102 includes a receiver 306 and a transmitter 308 for transmitting and receiving information via radio or other wireless signals (i.e., channel 310) to and from wireless devices 106 through 108. In one embodiment of the present invention, receiver 306 and transmitter 308 operate over channel 310 in accordance with the IEEE 802.11(b) wireless communication standard. All information sent and received via the receiver 306 and transmitter 308 is processed by a communications sub-processor 304.

The wireless base station 102 includes a main processor 312 that handles all processes associated with the receiving and transmitting functions of the wireless base station 102. The main processor 312 may also perform other functions of the wireless base station 102. FIG. 3 also includes storage 314 for storing information and main memory 316, such as a volatile memory element like a DRAM module or a non-volatile memory such as a Flash EEPROM module or both. The main memory 316 is used for storing data and instructions necessary for performing the functions of wireless base station 102. Communications bus 302 provides a conduit for communications between communications sub processor 304, the main processor 312, storage 314 and the main memory 316.

As explained above, wireless base station 102 can also include a network connection 318 to a communication interface 322 such as an Ethernet port. The connection 318 and communication interface 322 provide access to network 320 such as one or more of a LAN, a WAN, a PSTN, a dedicated line, or the like.

FIG. 4 is a diagram of a beacon packet 400 according to one embodiment of the present invention. The beacon packet 400 is a packet that is broadcast regularly (every 100 ms, for example) by the wireless base station 102 to all of the client stations (i.e., wireless device 106 through 108) connected wirelessly to the wireless base station 102. The beacon packet 400 holds a variety of information for processing by each wireless device connected wirelessly to the wireless base station 102. The present invention focuses on one aspect of the information that is present in the beacon packet 400: traffic indication. Traffic indication is information that indicates whether or not there is data buffered for a wireless device connected wirelessly to the wireless base station 102.

In the illustrated embodiment, the beacon packet 400 is compliant with the IEEE 802.11(b) wireless communication standard. In further embodiments, the beacon packet is compliant with the IEEE 802.11(g) standard, or with any other standard that includes a beacon packet or the like. The beacon packet 400 of FIG. 4 includes three major components: a preamble 402, a header that is referred to as the physical layer convergence procedure (PLCP) header 404 and a data portion that is referred to as the media access controller protocol data unit (MPDU) 406. (The exemplary embodiments described below use the 802.11(b) standard and thus the description uses "PLCP header" to refer to the header and "MPDU" to refer to the data portion. However, it is to be understood that this is merely done for ease of understanding. The present invention is not limited to the 802.11(b) standard, but is generally applicable to any communications standard or protocol that uses a beacon packet or the like.)

The illustrated beacon packet 400 shows from left to right the sequence of data that is broadcast by the wireless base station 102. That is, the leftmost data of the beacon packet 400 is sent before the rightmost data. Note that a standard beacon packet and its components are described in greater detail in sections 7.2.3, 7.2.3.1, and 7.3 of the published ANSI/IEEE Standard 802.11, 1999 Edition, and its supplements ANSI/IEEE Standard 802.11(b) (1999) and ANSI/IEEE Draft Standard 802.11(g) Draft 8.2, (April 2003), all of which are herein incorporated by reference in their entirety.

The preamble 402 has two fields: a synchronization field (SYNC) and a start frame delimiter (SFD) field. The preamble 402 may be a long preamble or alternatively a short preamble. In the case of a long preamble, the synchronization field 412 is 128 bits while the SFD field 422 is 16 bits. In the case of a short preamble, the synchronization field 412 is 56 bits while the SFD field 422 is 16 bits. The preamble 402 of the beacon packet 400 is transmitted at a rate of 1 Mbps under the 802.11(b) standard.

The PLCP header 404 has four fields: the signal field 414, the service field 416, the length field 418 and the cyclic redundancy check (CRC) field 420. The signal field 414 and the service field 416 are 8 bits each, while the length field 418 and the CRC field 420 are 16 bits each. The service field 416 is described in greater detail below with reference to FIG. 5. Under the 802.11(b) standard, the PLCP header 404 of the beacon packet 400 is transmitted at a rate of 1 Mbps if the preamble 402 was a long preamble. The PLCP header 404 of the beacon packet 400 is transmitted at a rate of 2 Mbps if the preamble 402 was a short preamble.

The MPDU 406 has 8 fields: a frame control field 436 of 16 bits, a duration field 446 of 16 bits, a destination address field 456 of 48 bits, a source address field 466 of 48 bits, a basic service set identification (BSSID) field 476 of 48 bits, a sequence control field 486 of 16 bits, a frame body field 496 of varying length and a frame check sequence (FCS) field 497 of 32 bits.

The frame body field 496 has several sub-fields. As described in the standard and its supplements, these sub-fields include a timestamp field 450 of 64 bits, a beacon interval field 451 of 16 bits and a capability field 452 of 16 bits. The frame body field 496 further includes a service set identifier (SSID) field 453 of length 16 bits plus 8 additional bits for every character in the SSID (the number of characters in the SSID is from zero to 32). The frame body field 496 also includes a supplemental rates field 454 of length 16 bits plus 8 additional bits for each supported rate up to a maximum of eight (e.g., there are four supported rates for the 802.11(b) standard). The frame body field 496 further includes a parameter field 455 of length 24 to 88 bits.

Additionally, the frame body field 496 includes a traffic indication map (TIM) field 457 of length 40+8x bits, where x satisfies the inequality 1≦x≦251 under the 802.11(b) standard. More specifically, the TIM field 457 is 40 bits plus one additional bit for every client station that is connected wirelessly to the wireless base station 102, with a requirement that the number of additional bits is a multiple of eight. If the number of wirelessly connected client stations is not a multiple of 8, then from one to seven additional (meaningless) bits are simply appended as needed to the end of the TIM field 457 so that the total number of additional bits in the TIM field 457 is divisible by eight. The TIM field 457 includes information regarding whether or not there is data buffered for each of the client stations (i.e., wireless devices 106 through 108) that are connected wirelessly to the wireless base station 102. Specifically, for each wireless device that is connected wirelessly to the wireless base station 102, there is a corresponding 1-bit value in the TIM field 457 that specifies whether or not there is data buffered for that wireless device. The MPDU 406 of the beacon packet 400 is transmitted at a rate of 1, 2, 5.5 or 11 Mbps under the 802.11(b) standard.

Conventionally, a client station (or wireless device) 106 must process the entire beacon packet 400 in order to determine whether there is data buffered for that wireless device 106. This is wasteful of processing resources, as the wireless device 106 is forced to process a multitude of information that is not useful if there is no data buffered for that wireless device 106. This is compounded by the fact that a beacon packet is broadcast very frequently (every 100 ms under the 802.11(b) standard). Further, during processing of a beacon packet, the wireless device 106 must be in a normal operating mode, and therefore consuming power resources at a normal operating rate. This is wasteful of battery resources with portable devices, as the wireless device 106 is forced to expend battery resources to process information that is not useful. Again, this is compounded by the fact that a beacon packet is broadcast very frequently.

Specifically, in one example, a beacon packet is broadcast by a wireless base station 102 to a wireless device 106 at 11 Mbps (using a short preamble 402) so as to have a duration greater than 137 µs (microseconds). Note that the MPDU 406 varies in length (see description above) and thus the length, or duration, of the beacon packet 400 will vary. Of the total duration, 72 µs is the duration of the preamble 402, 24 µs is the duration of the PLCP header 404 and greater than 41 µs is the duration of the MPDU 406. The TIM 457, which varies in length and thus in duration, consists of from 48 to 2048 bits and has a duration of from 4.4 to 186.2 µs, when the beacon packet is sent at 11 Mbps. Therefore, conventionally, the wireless device 106 is required to process for greater than 137 µs in order to process the traffic information in the TIM 457, which is located almost at the end of the beacon packet (processing of the FCS is required to validate correct reception of the TIM). As a result, the wireless device 106 is required to consume power at a normal operating rate for this duration for each beacon packet received. This is compounded by the fact that a beacon packet is broadcast very frequently (e.g., every 100 ms or so).

In embodiments of the present invention, at least some traffic indication information is sent earlier in the beacon packet so as to reduce such inefficiencies. In one illustrative embodiment of the present invention, a traffic flag indicator is placed in a reserved bit of the service field 416 of the PLCP header 404 of the beacon packet 400. The service field 416 of the beacon packet 400 of this embodiment is described in greater detail below with reference to FIG. 5. The traffic indicator flag is a single bit that indicates whether or not there is data buffered for any of wireless devices 106 through 108 that are connected wirelessly to the wireless base station 102. When the traffic indicator flag is set to a first logic value (one, for example), this indicates that there is data buffered for at least one of the wireless devices 106 through 108 that are connected wirelessly to the wireless base station 102. The information as to exactly which of the wireless devices 106 through 108 is still found in the client-specific indicator flags in the TIM field 457. When the traffic indicator flag is set to a second logic value (zero, for example), this indicates that there is currently no data buffered for any of the wireless devices 106 through 108 that are connected wirelessly to the wireless base station 102. An exemplary process of setting the traffic indicator flag is described in greater detail below with reference to FIG. 6.

The placement of the traffic indicator flag in the service field 416 of the PLCP header 404 in this embodiment eliminates the need for a wireless device 106 to process the entire beacon packet 400 in order to ascertain whether or not there is data buffered in many cases. Specifically, the placement of the traffic indicator flag in the service field 416 of the PLCP header 404 allows each wireless device 106 to process only 1) the preamble 402, 2) the PLCP header 404 and optionally 3) the frame control field 436 of the MPDU 406, in order to ascertain that there is no data buffered. This eliminates the need for a wireless device 106 to process all or substantially all of the MPDU 406 of the beacon packet when there is no data buffered. This allows the wireless device 106 to enter into sleep mode earlier, which results in a savings of battery power and processing resources. An exemplary process by which the traffic indicator flag is processed by a wireless device 106 is described in greater detail below with reference to FIG. 7.

This feature of the present invention reduces the duration of the pertinent portion of the beacon packet 400 when there is no data buffered. This is because the wireless device 106 is required to process only 1) the preamble 402 of duration 72 μs, 2) the PLCP header 404 of duration 24 μs and 3) the frame control field 436 of the MPDU 406 of duration 1.45 μs (assuming a short preamble 402 and an MPDU transmission rate of 11 Mbps). Thus, the total duration of the pertinent portion of the beacon packet 400 is 97.45 μs, which is considerably shorter than the duration of a complete beacon packet 400 (>137 μs and up to approximately 348 μs). This reduces the amount of time the wireless device 106 is required to be in normal operating mode to process the beacon packet 400 (by at least 39.55 μs) whenever there is no data buffered. As a result, the wireless device 106 can enter into sleep mode earlier and save power. This savings is quickly compounded because beacon packets are sent very frequently.

This also reduces the amount of processing resources that the wireless device 106 expends during processing of the beacon packet 400, since a smaller portion of the beacon packet 400 is processed in such cases. This allows a better and more efficient allocation of processing resources.

Note that because the traffic indicator flag is in the service field of the PLCP header, it is not necessary to process past this service field to determine whether or not there is data buffered. However, the length and CRC fields of the PLCP header and the frame control field of the MPDU are preferably also processed in order to insure correct reception and that this is a beacon packet.

Figures 5, 6:
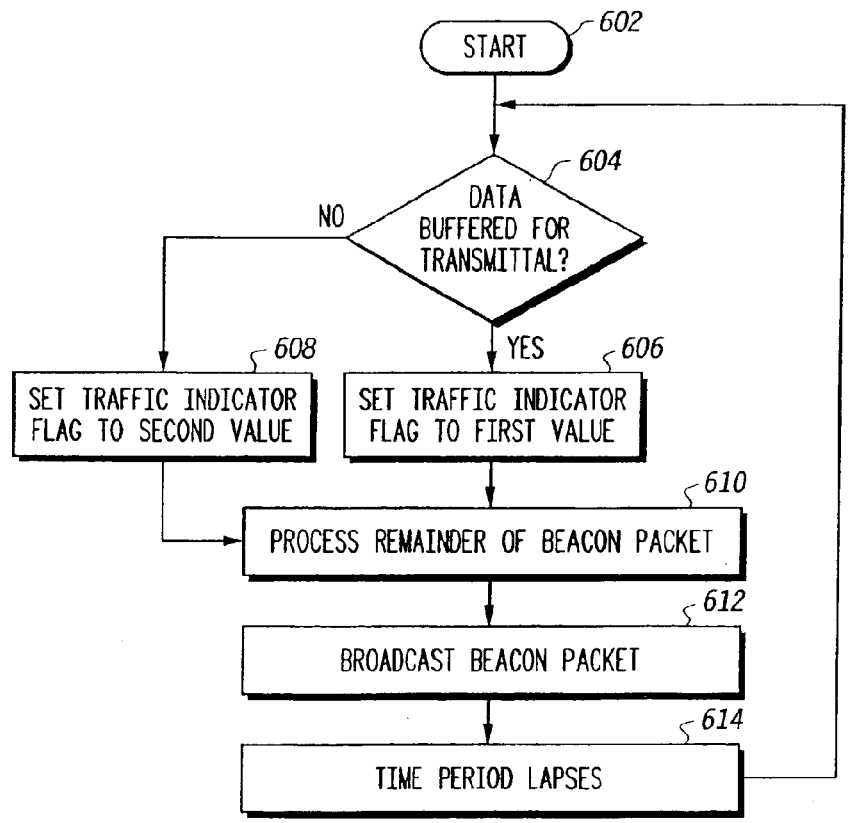
FIG. 5 is a more detailed diagram of a portion of the beacon packet of FIG. 4.
FIG. 6 is an operational flow diagram showing a beacon packet generation process according to one embodiment of the present invention.

FIG. 5 is a more detailed diagram of a portion of the beacon packet of FIG. 4. Specifically, FIG. 5 shows the service field 416 of the PLCP header 404 of the beacon packet 400. The service field 416 includes 8 bits, named b0 to b7. In the 802.11(b) standard, bit 506, or b2, is designated as a locked clocks bit, bit 508, or b3, is designated as a modulation selection bit, bit 516, or b7, is designated as a length extension bit, and bits 502, 504, 510, 512 and 514 (or bits b0, b1, b4, b5, and b6) are reserved bits. Note that the conventional service field and its components are described in greater detail in section 15.2.3.4 of the published ANSI/IEEE Standard 802.11 and its supplements.

In an embodiment of the present invention, a traffic indicator flag is placed in a reserved bit of the service field 416 of the PLCP header 404 of the beacon packet 400. The traffic indicator flag in this exemplary embodiment is a single bit that indicates whether or not there is data buffered for any of the wireless devices 106 through 108 that are connected wirelessly to the wireless base station 102. When the traffic indicator flag is set to a first logic value, this indicates that there is data buffered for one or more of the wireless devices 106 through 108 that are connected wirelessly to the wireless base station 102. The information as to exactly which of the wireless devices 106 through 108 is found in the TIM field 457. When the traffic indicator flag is set to a second logic value, this indicates that there is no data buffered for any of the wireless devices 106 through 108 that are connected wirelessly to the wireless base station 102. The process of setting the traffic indicator flag in one exemplary embodiment is described in greater detail below with reference to FIG. 6.

In preferred embodiments of the present invention, the traffic indicator flag is placed in reserved bit 502, reserved bit 504 or reserved bit 510 (b0, b1 or b4) of the service field 416 of the PLCP header 404 of the beacon packet 400. This is because section 19.3.2.1 of the published ANSI/IEEE Standard 802.11(g) Draft 8.2 assigns uses to reserved bits 512 and 514 (or b5 and b6). However, in further embodiments, the traffic indicator flag (i.e., bit or bits) is placed anywhere before the TIM field of the beacon packet, and preferably is placed in the preamble or header field of the beacon packet.

FIG. 6 is an operational flow diagram showing a beacon packet generation process according to one embodiment of the present invention. The operational flow diagram of FIG. 6 shows an overall process of how the beacon packet 400 is generated by a wireless base station 102 and broadcast to wireless devices 106 through 108 that are connected wirelessly to the wireless base station 102. The operational flow diagram of FIG. 6 begins with step 602 and flows directly to step 604.

In step 604, the wireless base station 102 determines whether there is any data buffered for transmittal to any of the wireless devices 106 through 108 that are connected wirelessly to the wireless base station 102. If the result of this determination is positive, then control flows to step 606. If the result of this determination is negative, then control flows to step 608.

In step 606, the wireless base station 102 sets the designated traffic indicator flag, such as reserved bit 502, 504 or 510 (or b0, b1 or b4) of the service field 416 of the PLCP header 404 of the beacon packet 400 under the 802.11(b) standard, to a first logic value, such as one. In alternative step 608, the wireless base station 102 sets the designated traffic indicator flag to a second logic value, such as zero. In step 610, the wireless base station 102 processes the remaining portions of the beacon packet 400. In step 612, the beacon packet 400 is broadcast by the wireless base station 102 via the transmitter 308 over the appropriate radio (or other wireless) channel 310.

In step 614, a time period corresponding to the interval between beacon packets 400 (such as 100 ms) lapses. Then control flows back to step 604, where the process of generating a subsequent beacon packet 400 commences.

Figure 7:
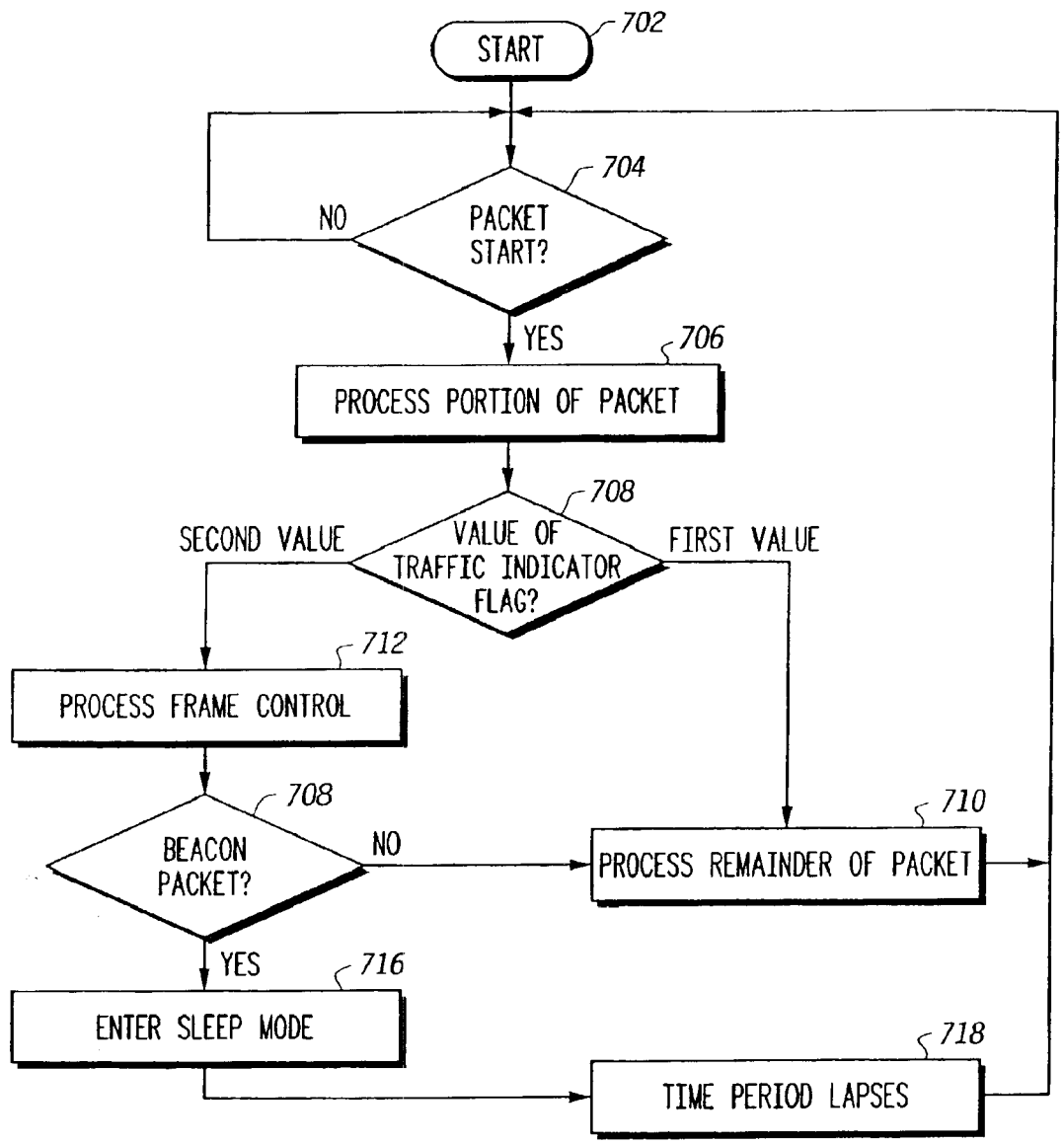
FIG. 7 is an operational flow diagram showing packet processing according to one embodiment of the present invention.

FIG. 7 is an operational flow diagram showing packet processing according to one embodiment of the present invention. The operational flow diagram of FIG. 7 shows an overall process of how the beacon packet 400 is processed by a wireless device 106 that is connected wirelessly to the wireless base station 102. The operational flow diagram of FIG. 7 begins with step 702 and flows directly to step 704.

In step 704, the wireless device 106 determines whether the start of an information packet has been received from the wireless base station 102 (i.e., by the receiver 206 over the data channel 210). If the result of this determination is positive, then control flows to step 706. If the result of this determination is negative, then control flows back to step 704.

In step 706, the wireless device 106 processes the preamble 402 and the PLCP header 404 of the received packet. In step 708, the wireless device 106 determines the value of the traffic indicator flag, such as reserved bit 502, 504 or 510 of the service field 416 of the PLCP header of the received packet. If the result of this determination is a first logic value (one, for example), then control flows to step 710. If the result of this determination is a second logic value (zero, for example), then control flows to step 712. As explained above, when the traffic indicator flag is set to the first logic value, this indicates that there is data buffered for one or more of the wireless devices 106 through 108 that are connected wirelessly to the wireless base station 102. When the traffic indicator flag is set to the second logic value, this indicates that there is no data buffered for any of the wireless devices 106 through 108 that are connected wirelessly to the wireless base station 102.

In step 710, the wireless device 106 processes the remainder of the received packet. In this case, the information as to which of the wireless devices 106 through 108 have data buffered can be found in the TIM field 457, later in the received packet.

In step 712, the wireless device 106 processes the frame control field 436 of the MPDU 406 of the received packet. The frame control field 436 includes information associated with the type of the received packet. In step 714, the wireless device 106 determines from the information in the frame control field 436 whether the received packet is a beacon packet 400. If the result of this determination is positive, then control flows to step 716. If the result of this determination is negative, then control flows to step 710.

In step 716, the wireless device 106 enters into a sleep mode in which power is conserved. In step 718, a time period corresponding to the interval between beacon packets 400 (such as 100 ms) lapses. Then control flows back to step 704, where the processing of subsequent beacon packets 400 commences.

The present invention can be realized in hardware (such as by using logic circuits, registers, and state machines), software, or a combination of hardware and software (e.g., on a wireless device or base station). A system according to a preferred embodiment of the present invention can be realized in a centralized fashion in one information processing system, or in a distributed fashion where different elements are spread across several interconnected systems. Any kind of information processing system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product that includes all the features enabling the implementation of the methods described herein, and which, when loaded in a system, is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A system may include, inter alia, one or more information processing systems and/or computers and at least a machine-readable or computer-readable medium, allowing a system, to read data, instructions, messages or message packets, and other information from the machine-readable or computer-readable medium. The machine-readable or computer-readable medium may include non-volatile memory, such as ROM, Flash memory, Disk drive memory, CD-ROM, and other permanent storage. Additionally, a machine-readable or computer-readable medium may include, for example, volatile storage such as RAM, buffers, cache memory, and network circuits. Furthermore, the machine-readable or computer-readable medium may include information in a transitory state medium such as a network link and/or a network interface, including a wired network or a wireless network, that allow a computer system to read such computer-readable information.

Figure 8:
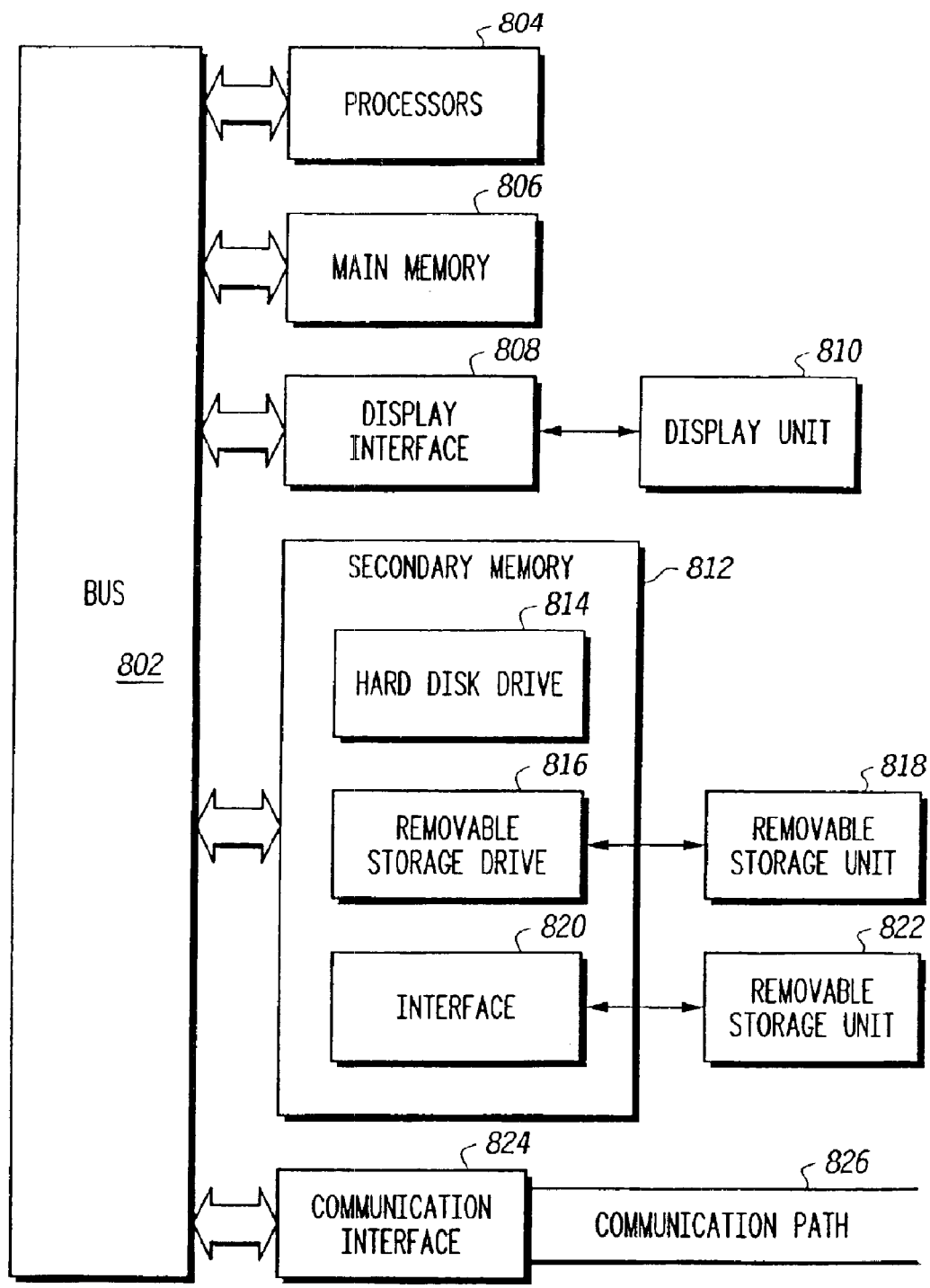
FIG. 8 is a block diagram of an information processing system useful for implementing the present invention.

FIG. 8 is a block diagram of a computer system useful for implementing an embodiment of the present invention. The computer system of FIG. 8 includes multiple processors, such as processors 804. The processors 804 are connected to a communication infrastructure 802 (e.g., a communications bus, cross-bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 808 that forwards graphics, text, and other data from the communication infrastructure 802 (or from a frame buffer not shown) for display on the display unit 810. The computer system also includes a main memory 806, preferably random access memory (RAM), and may also include a secondary memory 812. The secondary memory 812 may include, for example, a hard disk drive 814 and/or a removable storage drive 816, representing a floppy disk drive, a magnetic tape drive, an optical disk drive, etc. The removable storage drive 816 reads from and/or writes to a removable storage unit 818 in a manner well known to those having ordinary skill in the art. Removable storage unit 818, represents a floppy disk, magnetic tape, optical disk, etc., which is read by and written to by removable storage drive 816. As will be appreciated, the removable storage unit 818 includes a computer usable storage medium having stored therein computer software and/or data.

In some embodiments, the secondary memory 812 includes other similar means for allowing computer programs or other instructions to be loaded into the computer system. Such means may include, for example, a removable storage unit 822 and an interface 820. Examples of such may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to the computer system.

The computer system may also include a communications interface 824. Communications interface 824 allows software and data to be transferred between the computer system and external devices. Examples of communications interface 824 may include a modem, a network interface (such as an Ethernet card), a communications port, a PCM-CIA slot and card, etc. Communications interface 824 preferably includes one or more wireless communications interfaces, and can also include one or more wired communications interfaces. Software and data transferred via communications interface 824 are in the form of signals which may be, for example, electronic, electromagnetic, optical, or other signals capable of being received by communications interface 824. These signals are provided to communications interface 824 via a communications path (i.e., channel) 826. This channel 826 carries signals and may be implemented using wire or cable, fiber optics, a phone line, a cellular phone link, an RF link, and/or other communications channels.

In this document, the terms "computer program medium," "computer-usable medium," "machine-readable medium" and "computer-readable medium" are used to generally refer to media such as main memory 806 and secondary memory 812, removable storage drive 816, a hard disk installed in hard disk drive 814, and signals. These computer program products are means for providing software to the computer system. The computer-readable medium allows the computer system to read data, instructions, messages or message packets, and other computer-readable information from the computer-readable medium. The computer-readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer-readable medium may include computer-readable information in a transitory state medium such as a network link and/or a network interface, including a wired network or a wireless network, that allow a computer to read such computer-readable information.

Computer programs (also called computer control logic) are stored in main memory 806 and/or secondary memory 812. Computer programs may also be received via communications interface 824. Such computer programs, when executed, enable the computer system to perform the features of the present invention as discussed herein. In particular, the computer programs, when executed, enable the processor 804 to perform the features of the computer system. Accordingly, such computer programs represent controllers of the computer system.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method for broadcasting a beacon packet to one or more client stations, the beacon packet including a preamble, a header and a data portion, the method comprising the steps of:
    determining if there is any data buffered for any of the client stations;
    if there is data buffered, setting a traffic indicator flag to a first logic value, the traffic indicator flag being located before the data portion of the beacon packet;
    if there is not any data buffered, setting the traffic indicator flag to a second logic value, which is different than the first logic value; and
    broadcasting the beacon packet to the client stations.

2. The method of claim 1, wherein the traffic indicator flag is located in the header of the beacon packet.

3. The method of claim 2,
    wherein the header includes a service portion in accordance with an IEEE 802.11 communications standard, and
    the traffic indicator flag is located in the service portion of the header.

4. The method of claim 3, wherein the traffic indicator flag is located in one bit of the service portion of the header that is reserved under the IEEE 802.11 communications standard.

5. The method of claim 1, wherein in the broadcasting step, the beacon packet is broadcast in accordance with an IEEE 802.11 communications standard.

6. A method for processing a beacon packet, the beacon packet including a preamble, a header and a data portion, the method comprising the steps of:
    receiving the beacon packet;
    processing a first portion of the beacon packet so as to determine a value of a traffic indicator flag in the beacon packet, the traffic indicator flag being located before the data portion of the beacon packet;
    if the traffic indicator flag has a first logic value, entering a sleep mode; and
    if the traffic indicator flag has a second logic value, remaining in normal operating mode and processing all or substantially all of the remaining portion of the beacon packet.

7. The method of claim 6, wherein the traffic indicator flag is located in the header of the beacon packet.

8. The method of claim 7, wherein the header includes a service portion in accordance with an IEEE 802.11 communications standard, and
    the traffic indicator flag is located in the service portion of the header.

9. The method of claim 8, wherein the traffic indicator flag is located in one bit of the service portion of the header that is reserved under the IEEE 802.11 communications standard.

10. The method of claim 6, further comprising a step of:
    after entering the sleep mode, remaining in the sleep mode for a predetermined period.

11. The method of claim 6, wherein in the receiving step, the beacon packet is received in accordance with an IEEE 802.11 communications standard.

12. The method of claim 6,
    wherein the beacon packet is in accordance with an IEEE 802.11 communications standard, and
    the first portion that is processed consists of the preamble, the header, and a frame control field of the data portion.

13. The method of claim 12, wherein in the step of remaining in normal operating mode and processing all or substantially all of the remaining portion of the beacon packet, the data portion is processed through at least part of a TIM field of the data portion if the traffic indicator flag has the second logic value.

14. The method of claim 6, wherein in the step of remaining in normal operating mode and processing all or substantially all of the remaining portion of the beacon packet, the data portion is processed through at least part of a TIM field of the data portion if the traffic indicator flag has the second logic value.

15. A wireless device for processing a beacon packet, the beacon packet including a preamble, a header and a data portion, the wireless device comprising:
    a receiver for receiving the beacon packet; and
    a processor coupled to the receiver, wherein the processor is programmed:
    to process a first portion of the beacon packet so as to determine a value of a traffic indicator flag in the beacon packet, the traffic indicator flag being located before the data portion of the beacon packet;
    if the traffic indicator flag has a first logic value, to cause the wireless device to enter a sleep mode; and
    if the traffic indicator flag has a second logic value, to cause the wireless device to remain in normal operating mode and to process all or substantially all of the remaining portion of the beacon packet.

16. The wireless device according to claim 15, wherein the header includes a service portion in accordance with an IEEE 802.11 communications standard, and the traffic indicator flag is located in the service portion of the header.

17. A wireless base station for generating and transmitting a beacon packet to client stations, the beacon packet including a preamble, a header and a data portion, the wireless base station comprising:

a processor, wherein the processor is programmed:
to determine if there is any data buffered for any of the client stations;
if there is data buffered, to set a traffic indicator flag to a first logic value, the traffic indicator flag being located before the data portion of the beacon packet; and
if there is not any data buffered, to set the traffic indicator flag to a second logic value, which is different than the first logic value; and a transmitter for broadcasting the beacon packet to the client stations.

18. The wireless base station according to claim 17, wherein the header includes a service portion in accordance with an IEEE 802.11 communications standard, and the traffic indicator flag is located in the service portion of the header.

* * * * *